United States Patent
Zhang et al.

(10) Patent No.: US 12,061,389 B2
(45) Date of Patent: Aug. 13, 2024

(54) LIQUID CRYSTAL DISPLAY DEVICE

(71) Applicant: WUHAN CHINA STAR OPTOELECTRONICS TECHNOLOGY CO., LTD., Wuhan (CN)

(72) Inventors: Jie Zhang, Wuhan (CN); Lei Zhu, Wuhan (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/289,186

(22) PCT Filed: Mar. 15, 2021

(86) PCT No.: PCT/CN2021/080785
§ 371 (c)(1),
(2) Date: Sep. 9, 2022

(87) PCT Pub. No.: WO2022/183525
PCT Pub. Date: Sep. 9, 2022

(65) Prior Publication Data
US 2024/0012284 A1 Jan. 11, 2024

(30) Foreign Application Priority Data
Mar. 1, 2021 (CN) .......................... 202110227692.3

(51) Int. Cl.
*G02F 1/1335* (2006.01)
*G02F 1/1333* (2006.01)
*G02F 1/13357* (2006.01)

(52) U.S. Cl.
CPC .. *G02F 1/133531* (2021.01); *G02F 1/133314* (2021.01); *G02F 1/133608* (2013.01)

(58) Field of Classification Search
None
See application file for complete search history.

(56) References Cited

U.S. PATENT DOCUMENTS

2009/0147167 A1* 6/2009 Park .................. G02F 1/134363
349/1

FOREIGN PATENT DOCUMENTS

CN   205193761 U  *  4/2016
CN   108925028 A     11/2018
(Continued)

OTHER PUBLICATIONS

Translation of CN-205193761-U (Year: 2016).*

*Primary Examiner* — Phu Vu
(74) *Attorney, Agent, or Firm* — PV IP PC; Wei Te Chung; Zhigang Ma

(57) ABSTRACT

An embodiment of the application discloses a liquid crystal display device. In the liquid crystal display device, the backlight module includes a backlight module including a conductive back frame; a display panel including a liquid crystal cell and a first polarizer, wherein the first polarizer is disposed on a side of the liquid crystal cell facing the backlight module, and the first polarizer includes a conductive structure layer, a first base layer, and a polarizing layer disposed on the backlight module in sequence; and a conductive component electrically connected to the conductive back frame and the conductive structure layer.

19 Claims, 5 Drawing Sheets

(56) References Cited

FOREIGN PATENT DOCUMENTS

| | | | |
|---|---|---|---|
| CN | 109633982 | A | 4/2019 |
| CN | 110018585 | A | 7/2019 |
| KR | 20080071490 | A | 8/2008 |

* cited by examiner

LIQUID CRYSTAL DISPLAY DEVICE

RELATED APPLICATIONS

This application is a Notional Phase of PCT Patent Application No. PCT/CN2021/080785 having international filing date of Mar. 15, 2021, which claims the benefit of priority of Chinese Patent Application No. 202110227692.3 filed on Mar. 1, 2021. The contents of the above applications are all incorporated by reference as if fully set forth herein in their entirety.

BACKGROUND OF INVENTION

Field of Invention

The present application relates to the field of display technology, in particular to a liquid crystal display device.

Description of Prior Art

Howling on mobile phones has become a major problem in the display screen industry in recent years. The so-called howling means that when a person's ears are close to the screen of a mobile phone, they will continue to hear a croaking sound similar to an electric current, wherein the sound level varies with the sensitivity of different people to low-frequency/high-frequency sounds. Therefore, the mobile phone's howling impacts the user experience.

SUMMARY OF INVENTION

Embodiments of the present application provide a liquid crystal display device, which can reduce the risk of howling of the liquid crystal display device.

An embodiment of the present application provides a liquid crystal display device, which includes:
- a backlight module including a conductive back frame;
- a display panel disposed on the backlight module and including a liquid crystal cell and a first polarizer, wherein the first polarizer is disposed on a side of the liquid crystal cell facing the backlight module, and the first polarizer includes a conductive structure layer, a first base layer, and a polarizing layer disposed on the backlight module in sequence; and
- a conductive component electrically connected to the conductive back frame and the conductive structure layer.

Optionally, the conductive structure layer includes a first adhesive layer and a conductive material, and the conductive material is doped in the first adhesive layer.

Optionally, the conductive material includes at least one of silver, gold, or graphene.

Optionally, the conductive structure layer includes a first adhesive layer and a light-transmitting conductive layer stacked in sequence, the light-transmitting conductive layer is formed on a side of the first base layer facing the first adhesive layer, and the conductive component is connected to the light-transmitting conductive layer.

Optionally, the light-transmitting conductive layer includes a first branch, a second branch, and a trunk portion, and the first branch and the second branch are connected to a same side of the trunk portion; and
the trunk portion extends along a first direction, the first branch extends outward from the trunk portion along a second direction, and the second branch extends outward from the trunk portion along a third direction, wherein the first direction, the second direction, and the third direction are in a same plane.

Optionally, any two of the first direction, the second direction, and the third direction intersect each other.

Optionally, the first direction is parallel to the second direction, and the second direction intersects the third direction.

Optionally, a width of the trunk portion is greater than a width of the first branch and a width of the second branch, respectively.

Optionally, the first branch and the second branch are disposed at outer peripheries of pixels of the liquid crystal display device.

Optionally, the conductive structure layer includes a first adhesive layer, a light-transmitting conductive layer, and an intermediate adhesive layer stacked in sequence, the intermediate adhesive layer is connected to the first base layer, and the conductive component is connected to the light-transmitting conductive layer.

Optionally, the light-transmitting conductive layer includes a first branch, a second branch, and a trunk portion, and the first branch and the second branch are connected to a same side of the trunk portion;
the trunk portion extends along a first direction, the first branch extends outward from the trunk portion along a second direction, and the second branch extends outward from the trunk portion along a third direction, wherein the first direction, the second direction, and the third direction are in a same plane; and
any two of the first direction, the second direction, and the third direction intersect each other.

Optionally, a width of the trunk portion is greater than a width of the first branch and a width of the second branch.

Optionally, the first branch and the second branch are disposed at outer peripheries of pixels of the liquid crystal display device.

Optionally, a material of the light-transmitting conductive layer includes at least one of graphene, silver, or indium tin oxide.

Optionally, the backlight module further includes a light-shielding glue, a frame, and an optical film, the frame is disposed in the conductive back frame, the frame and the conductive back frame are connected to form a placement groove, and the optical film is disposed in the placement groove; wherein the light-shielding glue is disposed on the frame, and wherein the first polarizer is disposed on the light-shielding glue; and
an outer wall of the frame is provided with a groove, the conductive back frame includes a bottom back plate and a side plate, the side plate is disposed on a peripheral side of the bottom back plate, and the side plate is disposed in the groove.

Optionally, the conductive component includes a first portion and a second portion connected with each other, the first portion is disposed on the light-shielding glue and connected to the conductive structure layer, and the second portion is attached and connected to the side plate.

Optionally, the conductive component includes a third portion connected to the second portion, and the third portion is attached and connected to a side of the bottom back plate away from the frame.

Optionally, an opening is provided on the frame, and the opening penetrates through the light-shielding glue and communicates with the groove; and
the conductive component includes a first portion and a second portion connected with each other, the first portion is disposed on the light-shielding glue and connected to the conductive structure layer, the second portion is disposed in the opening and extends into the groove, and the side plate is attached to an outer wall of the second portion.

Optionally, the conductive component is selected from one of metal sheet, conductive tape, and film with conductive material.

Optionally, the first polarizer further includes a second base layer and a second adhesive layer stacked on the polarizing layer in sequence, and the second adhesive layer is connected to the liquid crystal cell.

In an embodiment of the present application, a conductive component is configured to electrically connect the first polarizer and the conductive back frame, so that a difference in potential between the conductive back frame and the bottom of the display panel is constant to 0, and the conductive back frame and the display panel are prevented from forming a capacitance, thereby reducing or even avoiding a risk of mechanical vibration generated by exposing the film material inside the backlight mode to alternating voltage, which prevents the howling source from being further amplified.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

DETAILED DESCRIPTION OF PREFERRED EMBODIMENTS

Figure 1:
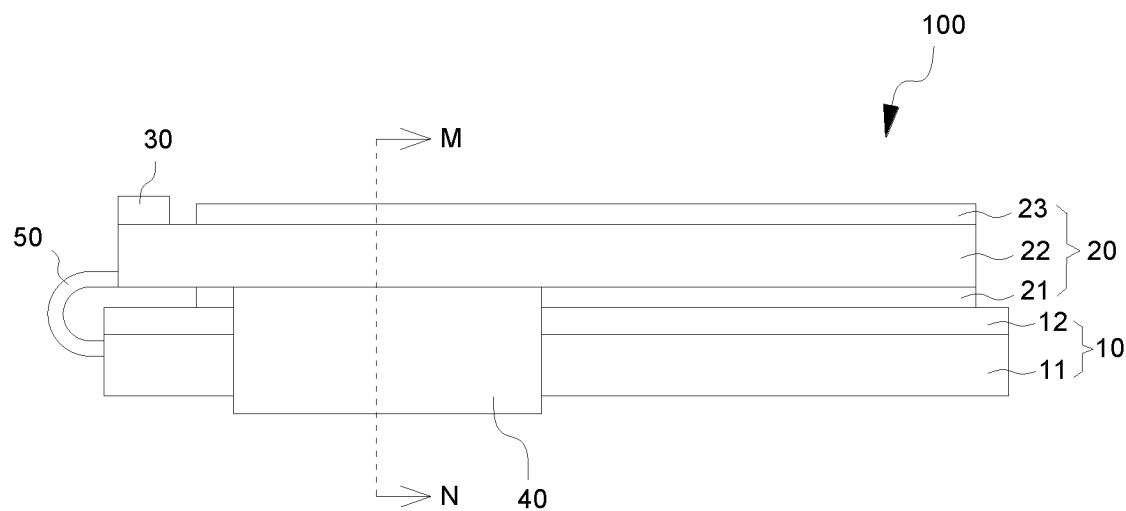
FIG. 1 is a schematic side view of a structure of a liquid crystal display device provided by the first embodiment of the present application.

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application. In addition, it should be understood that the specific implementations described here are only used to illustrate and explain the application, and are not used to limit the application. In the present application, unless otherwise stated, the orientation words used such as "upper" and "lower" generally refer to the upper and lower directions of the device in actual use or working state, and specifically refer to the drawing directions in the drawings, while "inner" and "outer" refer to the outline of the device.

An embodiment of the present application provides a liquid crystal display device, which will be described in detail below. It should be noted that the order of description in the following embodiments is not meant to limit the preferred order of the embodiments.

Figure 2:
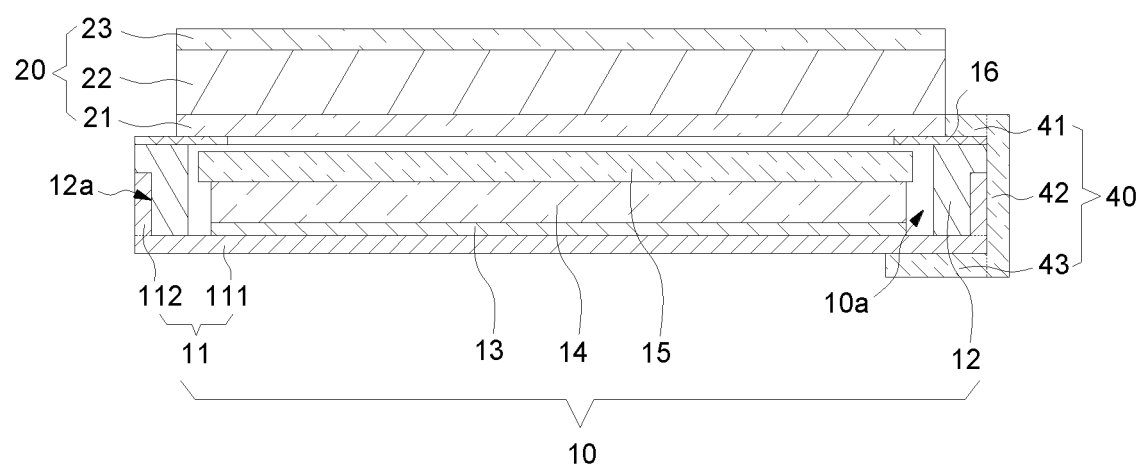
FIG. 2 is a schematic cross-sectional diagram of the liquid crystal display device in FIG. 1 along line MN.

Referring to FIG. 1 to FIG. 2, the first embodiment of the present application provides a liquid crystal display device 100, which includes a backlight module 10, a display panel 20, a chip 30, a conductive component 40 and a flexible circuit board 50.

The backlight module 10 includes a conductive back frame 11, a frame 12, a reflective sheet 13, a light guide plate 14, an optical film 15, and a light-shielding glue 16. The frame 12 is arranged in the conductive back frame 11. The frame 12 and the conductive back frame 11 are connected to form a placement groove 10a. The reflective sheet 13 is disposed on the conductive back frame 11 and is located in the placement groove 10a. The light guide plate 14 is disposed on the reflective sheet 13 and is located in the placement groove 10a. The optical film 15 is disposed on the light guide plate 14 and is located in the placement groove 10a. The light-shielding glue 16 is disposed on the frame 12.

In some embodiments, the backlight module 10 may also be a direct type backlight, while the conductive back frame 11 and the frame 12 remain unchanged.

The optical film 15 may be a single-layered optical film, or may be formed by stacking a plurality of optical films, such as a first diffusion film, a brightness enhancement film, and a second diffusion film.

The display panel 20 includes a first polarizer 21, a liquid crystal cell 22, and a second polarizer 23 that are stacked, sequentially. The first polarizer 21 is disposed on the light-shielding glue 16.

The display panel 20 is disposed on the backlight module 10. The chip 30 is bound on the display panel 20. The display panel 20 is electrically connected to the backlight module 10 through the flexible circuit board 50. The first polarizer 21 of the display panel 20 is electrically connected to the conductive back frame 11 of the backlight module 10 through the conductive component 40.

Figure 3:
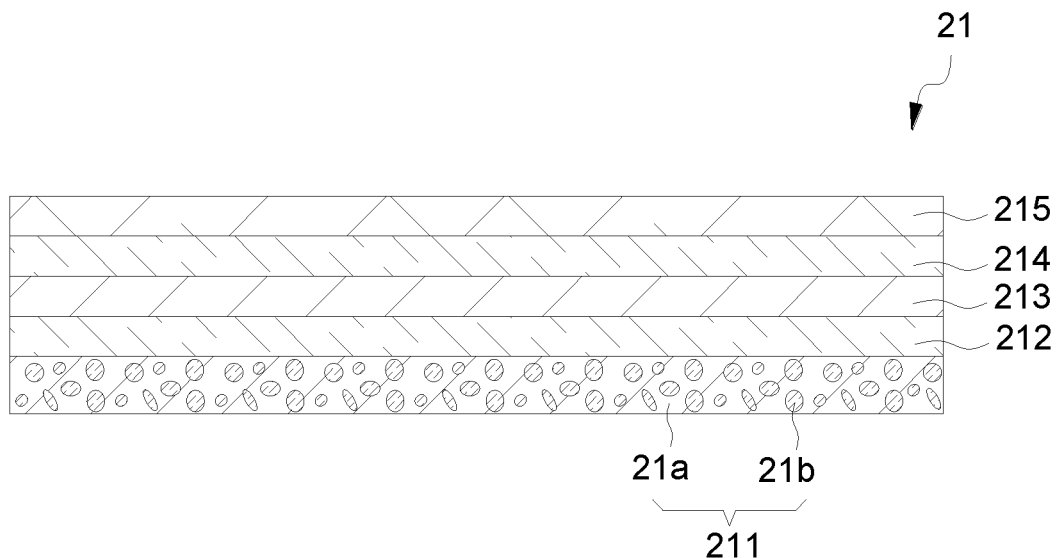
FIG. 3 is a schematic diagram of a structure of a first polarizer of the liquid crystal display device provided by the first embodiment of the present application.

Specifically, the first polarizer 21 is disposed on the side of the liquid crystal cell 22 facing the backlight module 10. Referring to FIG. 3, the first polarizer 21 includes a conductive structure layer 211, a first base layer 212, a polarizing layer 213, a second base layer 214, and a second adhesive layer 215 sequentially disposed on the backlight module 10. The second adhesive layer 215 is connected to the liquid crystal cell 22.

The material of the first base layer 212 and the second base layer 214 may include triacetyl cellulose (TAC). The material of the second adhesive layer 215 may include a pressure sensitive adhesive (PSA). The material of the polarizing layer 213 include polyvinyl alcohol (PVA).

The conductive component 40 is electrically connected to the conductive back frame 11 and the conductive structure layer 211.

The first embodiment of the present application uses a conductive component 40 to electrically connect the first polarizer 21 and the conductive back frame 11. When realizing a touch function, the chip 30 is crimped on the array substrate of the display panel 20, and the flexible circuit board 50 connects the display panel 20 and the backlight module 10 to form a circuit loop; the touch control and display driver integrated chip sends out pulse signals to form a howling source. Since the conductive component 40 is electrically connected to the first polarizer 21 and the conductive back frame 11, the difference in potential between the conductive back frame 11 and the bottom of the display panel 20 is constant to 0, and the conductive back frame and the display panel are prevented from forming a capacitance, thereby reducing or even avoiding a risk of mechanical vibration generated by exposing the film material inside the backlight mode to alternating voltage, which prevents the howling source from being further amplified.

Optionally, the conductive component 40 is selected from one of a metal sheet, a conductive tape, and a film with a conductive material. The metal sheet can be a copper foil sheet, an alloy foil sheet, an aluminum foil sheet, or other metal foil sheets.

Optionally, the conductive back frame 11 may be an iron back frame, an alloy back frame, or a back frame made of other conductive materials.

In the liquid crystal display device 100 of the first embodiment, referring to FIG. 3, the conductive structure layer 211 includes a first adhesive layer 21a and a conductive material 21b, and the conductive material 21b is doped in the first adhesive layer 21a.

The material of the first adhesive layer 21a may be the same as the material of the second adhesive layer 215.

In the liquid crystal display device 100 of the first embodiment, the conductive material 21b is doped in the first adhesive layer 21a, which not only makes the first polarizer 21 conductive, but also achieves the effect of thinning the first polarizer 21.

Optionally, the conductive component 40 is connected to a sidewall of the conductive structure layer 211. In some embodiments, the conductive component 40 may also be connected to the side of the conductive structure layer 211 facing the backlight module 10.

Optionally, the conductive material 21b includes at least one of silver, gold, and graphene. In the liquid crystal display device 100 of the first embodiment, the conductive material 21b is in a form of particles.

In the liquid crystal display device 100 of the first embodiment, an outer wall of the frame 12 is recessed to be formed with a groove 12a. The conductive back frame 11 includes a bottom back plate 111 and a side plate 112. The side plate 112 is provided on the peripheral side of the bottom back plate 111. The side plate 112 is disposed in the groove 12a.

The conductive component 40 includes a first portion 41, a second portion 42 and a third portion 43 connected in sequence. The first portion 41 is disposed on the light-shielding glue 16 and connected to the conductive structure layer 211. The second portion 42 is attached and connected to the side plate 112. The third portion 43 is attached and connected to the side of the bottom back plate 111 away from the frame 12.

Connecting the second portion 42 to the side plate 112 and connecting the third portion 43 to the bottom back plate 111 increase a connection area between the conductive component 40 and the conductive back frame 11 and improve the stability of the connection between the conductive component 40 and the conductive back frame 11.

In some embodiments, the third portion 43 can also be saved, that is, the first portion 41 is configured to connect the conductive structure layer 211, and the second portion 42 is configured to connect the side plate 112, so as to obtain a thinned liquid crystal display device 100 of the first embodiment.

Optionally, the third portion 43 and the bottom back plate 111 may be fixedly connected by, such as threaded connection, riveting connection, or crimping connection.

In the liquid crystal display device 100 of the first embodiment, the number of the conductive component 40 is at least one. The length of each conductive component 40 is less than the length of the first polarizer 21.

In some embodiments, the number of conductive components 40 is multiple, and the plurality of conductive components 40 are arranged at intervals to improve the stability of the electrical connection between the first polarizer 21 and the conductive back frame 11.

Figure 4:
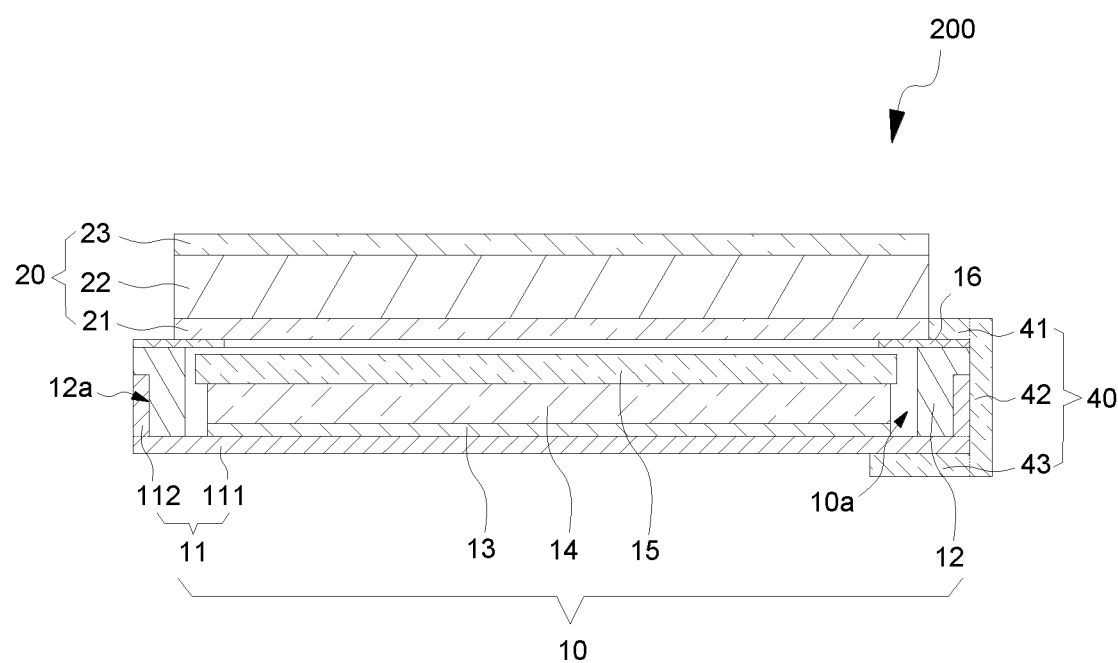
FIG. 4 is a schematic cross-sectional structure diagram of a liquid crystal display device provided by the second embodiment of the present application.
Figure 5:
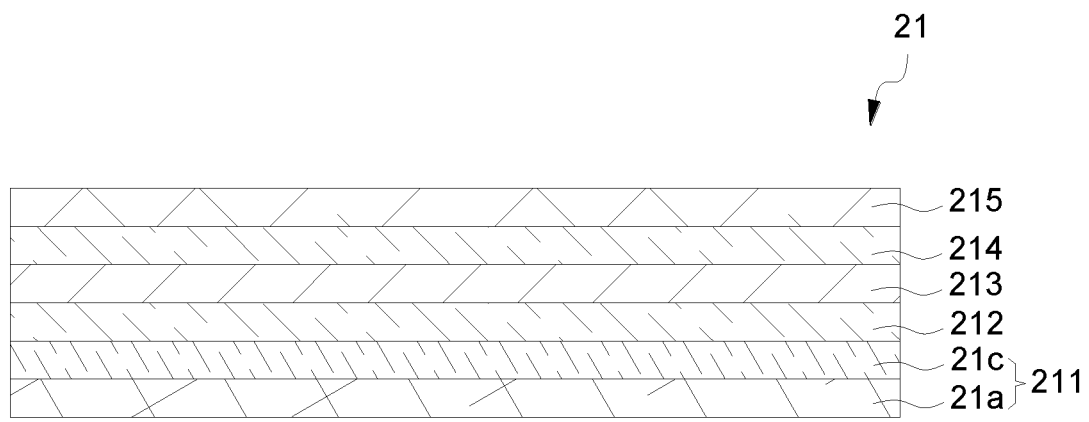
FIG. 5 is a schematic diagram of a structure of a first polarizer of the liquid crystal display device provided by the second embodiment of the present application.

Referring to FIG. 4 and FIG. 5, on the basis of the liquid crystal display device 100 of the first embodiment, the liquid crystal display device 200 of the second embodiment differs from the liquid crystal display device 100 of the first embodiment in that as follows:

The conductive structure layer 211 includes a first adhesive layer 21a and a light-transmitting conductive layer 21c stacked in sequence. The transparent conductive layer 21c is located between the first adhesive layer 21a and the first base layer 212. The conductive component 40 is connected to the light-transmitting conductive layer 21c.

Optionally, the material of the light-transmitting conductive layer 21c includes at least one of graphene, silver, indium tin oxide, or other light-transmitting conductive materials.

In the liquid crystal display device 200 of the second embodiment, the light-transmitting conductive layer 21c is formed on the first base layer 212, which improves the overall conductivity of the first polarizer 21 on the one hand, and increases the connection area between the light-transmitting conductive layer 21c and the conductive component 40 on the other hand, thereby improving the stability of the connection.

In the liquid crystal display device 200 of the second embodiment, the light-transmitting conductive layer 21c may cover the entire surface of the first base layer 212, or may be patterned. The light-transmitting conductive layer 21c is patterned to increase the transmittance of light through the light-transmitting conductive layer 21c.

Figure 6:
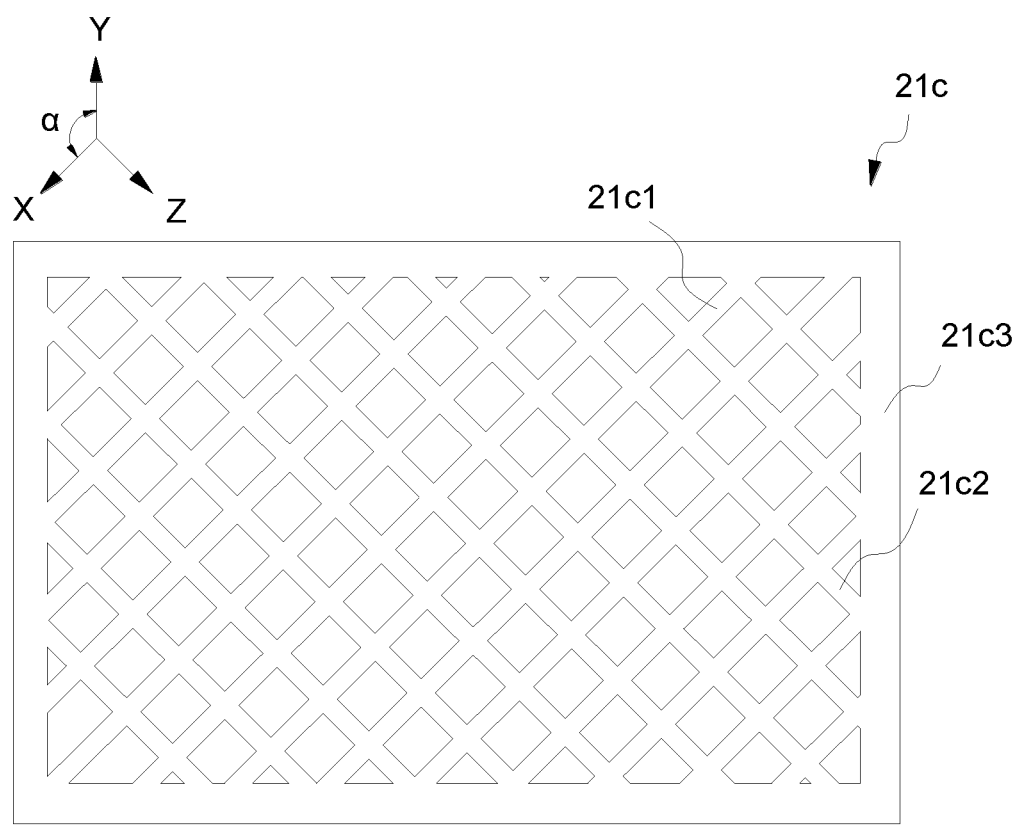
FIG. 6 is a schematic diagram of a structure of a light-transmitting conductive layer of the liquid crystal display device provided by the second embodiment of the present application.

Referring to FIG. 6, the light-transmitting conductive layer 21c includes a first branch 21c1, a second branch 21c2, and a trunk portion 21c3. The first branch 21c1 and the second branch 21c2 are both connected to the same side of the trunk portion 21c3.

The trunk portion 21c3 extends along the first direction Y. The first branch 21c1 extends outward from the trunk portion 21c3 along a second direction X, and the second branch 21c2 extends outward from the trunk portion 21c3 along a third direction Z, wherein the first direction Y, the second direction X, and the third direction Z are in a same plane.

Figure 7:
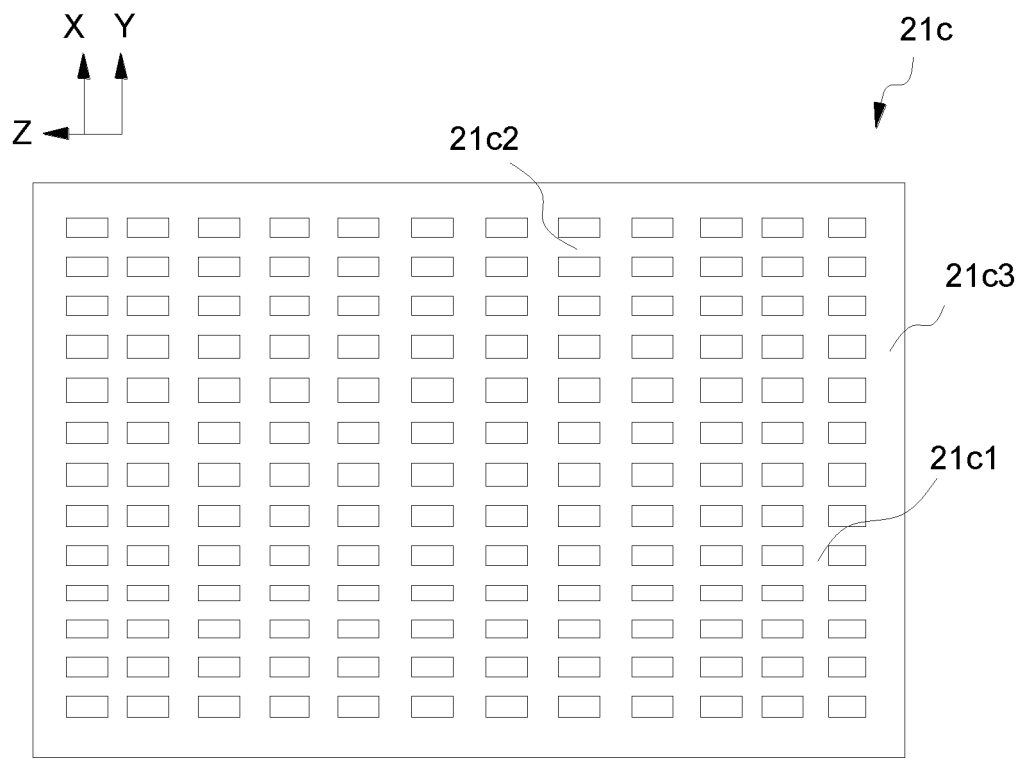
FIG. 7 is another schematic diagram of a structure of a light-transmitting conductive layer of the liquid crystal display device provided by the second embodiment of the present application.

Any two of the first direction Y, the second direction X, and the third direction Z are arranged to intersect each other;

or the first direction Y is parallel to the second direction X, and the second direction X intersects the third direction Z, as shown in FIG. 7. The liquid crystal display device 200 of the second embodiment is described by taking any two of the first direction Y, the second direction X, and the third direction Z intersecting each other as an example, but it is not particularly limited thereto.

The plurality of first branches 21c1 and the plurality of second branches 21c2 intersect each other to form a grid structure. On the one hand, the material of the light-transmitting conductive layer 21c can be saved, and on the other hand, it is convenient for the first adhesive layer 21a to connect the first base layer 212, reducing a risk of separation of the light-transmitting conductive layer 21c.

Optionally, the second direction X is perpendicular to the third direction Z. An included angle α between the first direction Y and the second direction X is an obtuse angle, such as 105 degrees, 120 degrees, 135 degrees, 150 degrees, or 165 degrees.

In addition, a width D1 of the trunk portion 21c3 is greater than a width of the first branch 21c1 and a width of the second branch 21c2, respectively, to improve the stability of the connection between the conductive component 40 and the light-transmitting conductive layer 21c.

Optionally, the first branch 21c1 and the second branch 21c2 are both arranged at the peripheries of the pixels of the liquid crystal display device 200 to further achieve the effect of improving the light transmittance. Based on such a structure, in one embodiment, the materials of the first branch 21c1 and the second branch 21c2 may be a non-transparent conductive material, such as a single-layered metal, or a stacked structure of multiple layers of metal, or a stacked structure of a pure metal layer and an alloy layer.

Figure 8:
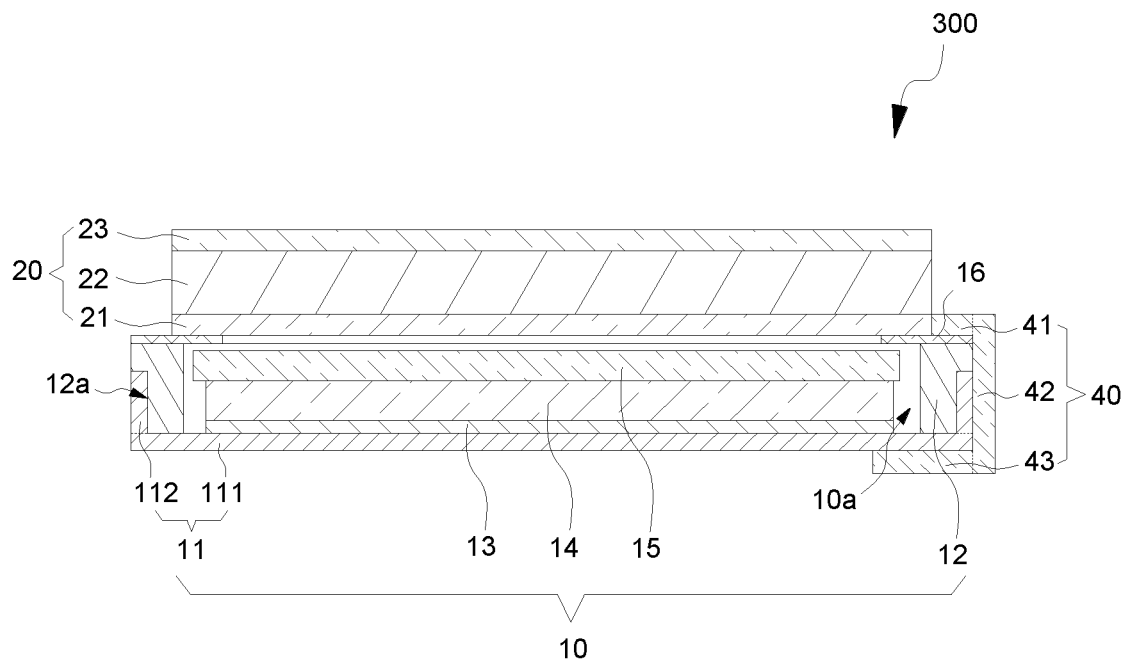
FIG. 8 is a schematic cross-sectional structure diagram of a liquid crystal display device provided by the third embodiment of the present application.
Figure 9:
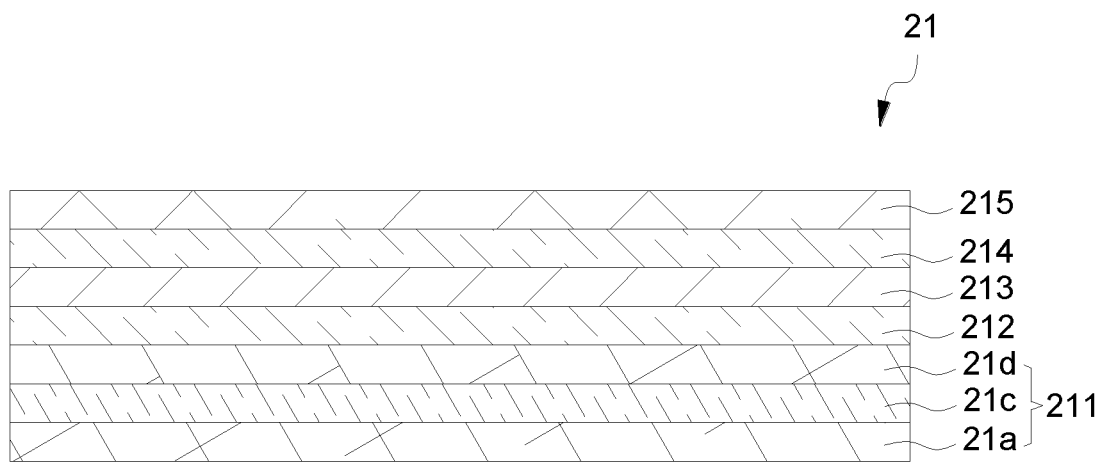
FIG. 9 is a schematic diagram of the structure of a first polarizer of the liquid crystal display device provided by the third embodiment of the present application.

Referring to FIG. 8 and FIG. 9, based on the liquid crystal display device 200 of the second embodiment, the liquid crystal display device 300 of the third embodiment differs from the liquid crystal display device 200 of the second embodiment in that as follows:

The conductive structure layer 211 includes a first adhesive layer 21a, a light-transmitting conductive layer 21c, and an intermediate adhesive layer 21d stacked in sequence. The intermediate adhesive layer 21d is connected to the first base layer 212. The conductive component 40 is connected to the light-transmitting conductive layer 21c.

In the third embodiment, an intermediate adhesive layer 21d is configured to bond the light-transmitting conductive layer 21c and the first base layer 212 to reduce the risk of separation between the light-transmitting conductive layer 21c and the first base layer 212.

Figure 10:
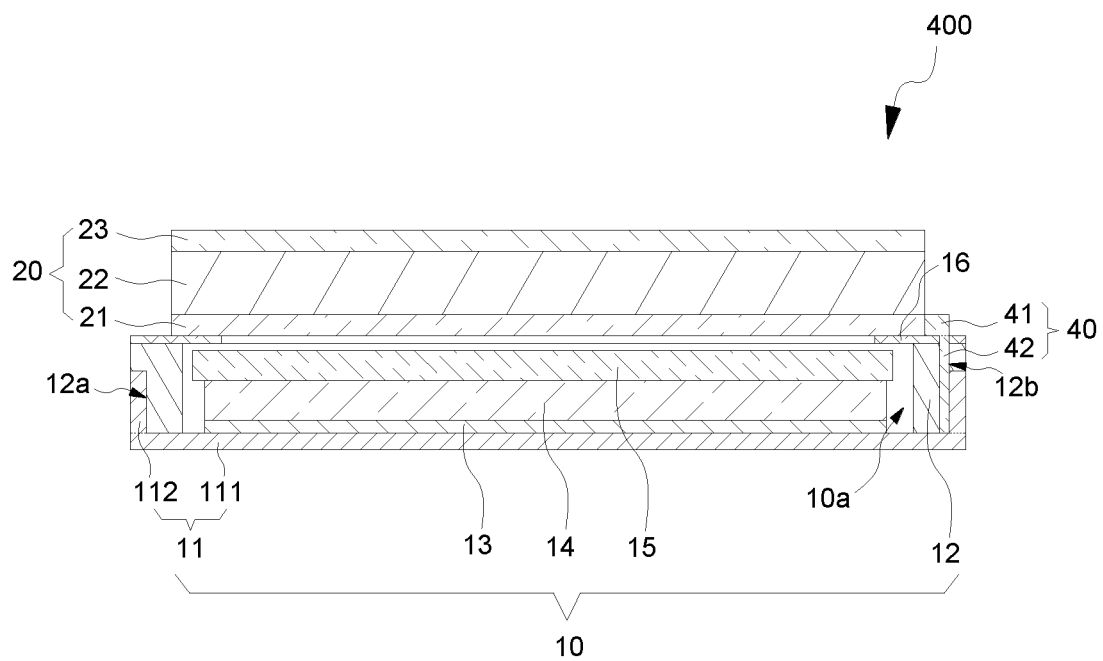
FIG. 10 is a schematic cross-sectional structure diagram of a liquid crystal display device provided by the fourth embodiment of the present application.

Referring to FIG. 10, in view of the liquid crystal display device (100, 200, or 300) of any of the first to third embodiments, the fourth embodiment is provided based on, for example, the first embodiment, but is not particularly limited thereto. The difference between the liquid crystal display device 400 of the fourth embodiment and the liquid crystal display device 100 of the first embodiment is in that as follows:

The frame 12 is provided with an opening 12b. The opening 12b penetrates through the light-shielding glue 16 and communicates with the groove 12a. The conductive component 40 includes a first portion 41 and a second portion 42 that are connected. The first portion 41 is disposed on the light-shielding glue 16 and connected to the conductive structure layer 211. The second portion 42 is disposed in the opening 12b and extends into the groove 12a. The side plate 112 is attached and connected to an outer wall of the second portion 42.

In the liquid crystal display device 400 of the fourth embodiment, the second portion 42 is arranged in the groove 12a, and connected to the second portion 42 and fastened by using the side plate 112, which not only saves the installation space of the second portion 42 and can protect the second portion 42.

The installation process of the conductive component 40 can be first to set the second portion 42 to penetrate through the opening 12b and dispose the second portion 42 in the groove 12a; then, to assemble the frame 12 and the conductive back frame 11 so that the side plate 112 is set in the groove 12a and fastened to the second portion 42; then, to install the reflective sheet 13, the light guide plate 14, and the optical film 15 on the conductive back frame 11; and then, to set the first portion 41 to penetrate through the opening of the light-shielding glue 16, and dispose the light-shielding glue 16 on the frame 12; secondly, to set the liquid crystal cell 22 bonded with the first polarizer 21 and the second polarizer 23 on the light-shielding glue 16, so that the conductive structure layer 211 is connected on the light-shield glue 16; and finally, to set the first portion 41 to electrically connect the conductive structure layer 211.

In an embodiment of the present application, a conductive component is configured to electrically connect the first polarizer and the conductive back frame, so that a difference in potential between the conductive back frame and the bottom of the display panel is constant to 0, and the conductive back frame and the display panel are prevented from forming a capacitance, thereby reducing or even avoiding a risk of mechanical vibration generated by exposing the film material inside the backlight mode to alternating voltage, which prevents the howling source from being further amplified.

The liquid crystal display device provided by the embodiments of the present application are described in detail above. Specific examples are used to explain the principle and implementation of the present application. The descriptions of the above embodiments are only used to help understand the present application. Also, for those skilled in the art, according to the ideas of the present application, there will be changes in the specific implementation and application scope. In summary, the content of this specification should not be construed as limiting the present application.

What is claimed is:

1. A liquid crystal display device, comprising:
   a backlight module comprising a conductive back frame;
   a display panel disposed on the backlight module and comprising a liquid crystal cell and a first polarizer, wherein the first polarizer is disposed on a side of the liquid crystal cell facing the backlight module, and the first polarizer comprises a conductive structure layer, a first base layer, and a polarizing layer disposed on the backlight module in sequence;
   a conductive component electrically connected to the conductive back frame and the conductive structure layer; and
   a light-shielding glue, a frame, and an optical film, wherein the frame is disposed in the conductive back frame, the frame and the conductive back frame are connected to form a placement groove, and the optical film is disposed in the placement groove; the light-shielding glue is disposed on the frame, and the first polarizer is disposed on the light-shielding glue; and an outer wall of the frame is provided with a groove, the conductive back frame comprises a bottom back plate and a side plate, the side plate is disposed on a peripheral side of the bottom back plate, and the side plate is disposed in the groove.

2. The liquid crystal display device according to claim 1, wherein the conductive structure layer comprises a first adhesive layer and a conductive material, and the conductive material is doped in the first adhesive layer.

3. The liquid crystal display device according to claim 2, wherein the conductive material comprises at least one of silver, gold, or graphene.

4. The liquid crystal display device according to claim 1, wherein the conductive structure layer comprises a first adhesive layer and a light-transmitting conductive layer stacked in sequence, the light-transmitting conductive layer is formed on a side of the first base layer facing the first adhesive layer, and the conductive component is connected to the light-transmitting conductive layer.

5. The liquid crystal display device according to claim 4, wherein the light-transmitting conductive layer comprises a first branch, a second branch, and a trunk portion, and the first branch and the second branch are connected to a same side of the trunk portion; and the trunk portion extends along a first direction, the first branch extends outward from the trunk portion along a second direction, and the second branch extends outward from the trunk portion along a third direction, wherein the first direction, the second direction, and the third direction are in a same plane.

6. The liquid crystal display device according to claim 5, wherein any two of the first direction, the second direction, and the third direction intersect each other.

7. The liquid crystal display device according to claim 5, wherein the first direction is parallel to the second direction, and the second direction intersects the third direction.

8. The liquid crystal display device according to claim 5, wherein a width of the trunk portion is greater than a width of the first branch and a width of the second branch, respectively.

9. The liquid crystal display device according to claim 5, wherein the first branch and the second branch are disposed at outer peripheries of pixels of the liquid crystal display device.

10. The liquid crystal display device according to claim 1, wherein the conductive structure layer comprises a first adhesive layer, a light-transmitting conductive layer, and an intermediate adhesive layer stacked in sequence, the intermediate adhesive layer is connected to the first base layer, and the conductive component is connected to the light-transmitting conductive layer.

11. The liquid crystal display device according to claim 10, wherein the light-transmitting conductive layer comprises a first branch, a second branch, and a trunk portion, and the first branch and the second branch are connected to a same side of the trunk portion;

the trunk portion extends along a first direction, the first branch extends outward from the trunk portion along a second direction, and the second branch extends outward from the trunk portion along a third direction, wherein the first direction, the second direction, and the third direction are in a same plane; and any two of the first direction, the second direction, and the third direction intersect each other.

12. The liquid crystal display device according to claim 11, wherein a width of the trunk portion is greater than a width of the first branch and a width of the second branch.

13. The liquid crystal display device according to claim 11, wherein the first branch and the second branch are disposed at outer peripheries of pixels of the liquid crystal display device.

14. The liquid crystal display device according to claim 4, wherein a material of the light-transmitting conductive layer comprises at least one of graphene, silver, or indium tin oxide.

15. The liquid crystal display device according to claim 1, wherein the conductive component comprises a first portion and a second portion connected with each other, the first portion is disposed on the light-shielding glue and connected to the conductive structure layer, and the second portion is attached and connected to the side plate.

16. The liquid crystal display device according to claim 15, wherein the conductive component comprises a third portion connected to the second portion, and the third portion is attached and connected to a side of the bottom back plate away from the frame.

17. The liquid crystal display device according to claim 1, wherein an opening is provided on the frame, and the opening penetrates through the light-shielding glue and communicates with the groove; and the conductive component comprises a first portion and a second portion connected with each other, the first portion is disposed on the light-shielding glue and connected to the conductive structure layer, the second portion is disposed in the opening and extends into the groove, and the side plate is attached to an outer wall of the second portion.

18. The liquid crystal display device according to claim 1, wherein the conductive component is selected from one of metal sheet, conductive tape, and film with conductive material.

19. The liquid crystal display device according to claim 1, wherein the first polarizer further comprises a second base layer and a second adhesive layer stacked on the polarizing layer in sequence, and the second adhesive layer is connected to the liquid crystal cell.

* * * * *